United States Patent [19]
Ettischer

[11] 3,925,797
[45] Dec. 9, 1975

[54] EXPOSURE CONTROL APPARATUS FOR A PHOTOGRAPHIC CAMERA HAVING INTERCHANGEABLE LENSES

[75] Inventor: Helmut Ettischer, Ruit, Germany

[73] Assignee: Eastman Kodak Company, Rochester, N.Y.

[22] Filed: Oct. 16, 1974

[21] Appl. No.: 515,273

[30] Foreign Application Priority Data
Sept. 26, 1975 Germany............................ 2352076

[52] U.S. Cl. .................. 354/197; 354/196; 352/142
[51] Int. Cl.²............................................ G03B 3/00
[58] Field of Search ........... 354/196, 197, 270, 247; 352/142

[56] References Cited
UNITED STATES PATENTS

| | | |
|---|---|---|
| 2,242,666 | 5/1941 | Walsh ............................ 352/142 X |
| 3,479,942 | 11/1969 | Land et al........................... 354/128 |
| 3,750,543 | 8/1973 | Eloranta et al. ...................... 354/27 |

Primary Examiner—Robert P. Greiner
Attorney, Agent, or Firm—D. P. Monteith

[57] ABSTRACT

A camera of the type having interchangeable lenses of different focal length locatable along a picture-taking axis includes a diaphragm shutter movable along an operational path between (1) an initial, light-blocking position and (2) a terminal, light-unblocking position, the magnitude of the shutter opening being functionally related to the position of the shutter along its operational path. A control member operably couples the shutter to an aperture setting member which is actuatable over a range of positions each of which is indicative of a camera f-stop value related to anticipated scene light conditions. A stop mechanism operatively associated with the control member is adjustable in response to whichever lens is selected for varying the terminal position to establish an effective exposure aperture which is related to the position at which said setting member is set and lens focal length.

8 Claims, 2 Drawing Figures

EXPOSURE CONTROL APPARATUS FOR A PHOTOGRAPHIC CAMERA HAVING INTERCHANGEABLE LENSES

BACKGROUND OF THE INVENTION

1. Field of the Invention

This invention relates to photographic cameras of the type including lens apparatus having different focal lengths, and more particularly to a camera of the kind having interchangeable lenses and an f-stop setting member operatively associated with a diaphragm shutter for setting the camera at a preselected f-stop value regardless of the lens in operation.

2. Description of the Prior Art

Diaphragm shutters provide control over both lens aperture size and shutter speed. Typically, a diaphragm shutter provides for a progressive variation of relative aperture sizes beginning from a light-blocking position toward a maximum apertured position. When sufficient scene light has passed through the continually varying aperture, light passage is blocked and an exposure interval terminated either by actuation of a separate opaque shutter member or by causing the aperture varying mechanism to reverse its direction of movement and return to its light-blocking position. A diaphragm shutter of the former type is disclosed in Research Disclosure Publication issued on January 1974 identified by the reference no. 11726 and entitled EXPOSURE CONTROL APPARATUS FOR STILL CAMERAS and a diaphragm shutter of the latter type is disclosed in U.S. Pat. No. 3,641,889 issued to Eloranta on Feb. 15, 1972, entitled EXPOSURE CONTROL SYSTEM.

Diaphragm shutters offer the advantage in that a single exposure control mechanism can be utilized to provide exposure control over both lens aperture size and shutter speed. In so doing, a compromise can be achieved between small relative apertures which require longer exposure times but which have a large depth of field, and large relative apertures with short exposure times for action scenes, but wherein the depth of field is small. In that regard, U.S. Pat. No. 3,513,760 issued to Kiper on May 26, 1970, and entitled CAMERA SHUTTER PARTICULARLY ADAPTED FOR USE AS A DIAPHRAGM discloses a diaphragm shutter in which the size of the aperture is set by an adjustable stop member prior to shutter movement. The stop member is adjustable as a function of both a manual aperture setting and a film speed setting. Furthermore, U.S. Pat. No. 3,750,543 issued to Eloranta et al. on Aug. 7, 1973, and entitled FOCUS RESPONSIVE EXPOSURE CONTROL SYSTEM discloses a diaphragm shutter in which an adjustable stop is set for flash photography in accordance with a focus setting member.

In cameras of the type having interchangeable lenses of different focal length, the aperture should be adapted to the focal length of the lens used to accommodate the light passing power of the operative lens or operative lens combination. German Auslegeschrift 1,038,092 discloses a photographic camera with interchangeable lenses or lens attachments whose common diaphragm aperture can be automatically adapted to the prevailing conditions. For this purpose, a device is necessary which comprises several control members serving to set the stop value associated with each of the lenses. When, in a first embodiment, the lens is inserted, the movement of a first control member parallel to the optical axis is deflected in a second direction of movement running at right angles to the optical axis. This is brought about by further control members cooperating with a diaphragm ring. In a second embodiment therein, the first control member, which is moved parallel to the optical axis, can also directly influence the diaphragm ring. This member is composed of a plurality of telescopically slidable parts requiring complicated adjustment and fitting operations. In accordance with a yet further embodiment therein, a control member is also required when the system is inserted by rotation, this control member forming an intermediate component which has to be pivoted between lens and diaphragm ring.

A diaphragm setting means of such complicated construction with a separate shutter in connection with interchangeable lenses can not be utilized in a compact camera for reasons of both space and cost.

SUMMARY OF THE INVENTION

One of the objects of the present invention is to provide an improved photographic camera of the type having a diaphragm shutter and means adapted to utilize lens apparatus having a plurality of focal lengths, wherein camera f-stop value variations are automatically eliminated from one lens combination to another.

A further object of the invention is to provide an improved camera of the type having interchangeable lenses of different focal lengths and a diaphragm shutter settable automatically at a particular maximum apertured position as a function of the lens being used.

A further object of the invention is to provide a camera of the aforementioned type having an f-stop value setting member actuatable to set camera f-stop independent of the lens in operation.

A still further object of the present invention is to provide a camera having a diaphragm shutter and interchangeable lenses and in which the shutter is adjusted automatically relative to the lens in operation without additional shutter control means being required.

A still further object of the invention is to provide an improved camera of the aformentioned type in which the f-stop setting member actuates a diaphragm shutter closing member once the aperture limiting value is achieved.

Another object of the instant invention is to provide an improved camera of the type having interchangeable lenses which camera is of simple design and construction and economical to manufacture.

In accordance with the above objects, a photographic camera having means adapted to locate lens apparatus having a plurality of focal lengths along a picture-taking axis and means actuatable for selecting a lens combination having a predetermined focal length includes a shutter mechanism movable along a path between an initial, closed position and a terminal, open position wherein a varying progression of shutter openings in registry with the picture-taking axis are formed, the size of these openings being functionally related to the position of the shutter mechanism along the path. The camera further includes means responsive to the lens combination selected for varying the terminal position whereby an effective camera exposure aperture is established functionally related to the focal length of the selected lens.

The invention, and its objects and advantages, will become more apparent in the detailed description of a preferred embodiment presented below.

BRIEF DESCRIPTION OF THE DRAWING

In the detailed description of a preferred embodiment of the invention presented hereinafter, reference is made to the accompanying drawing, in which.

DESCRIPTION OF A PREFERRED EMBODIMENT

Because photographic cameras are well known, the present description will be directed in particular to elements forming part of, or cooperating more directly with, apparatus in accordance with the present invention. It is to be understood camera elements not specifically shown or described may take various forms well known to those having skill in the art.

Figure 1:
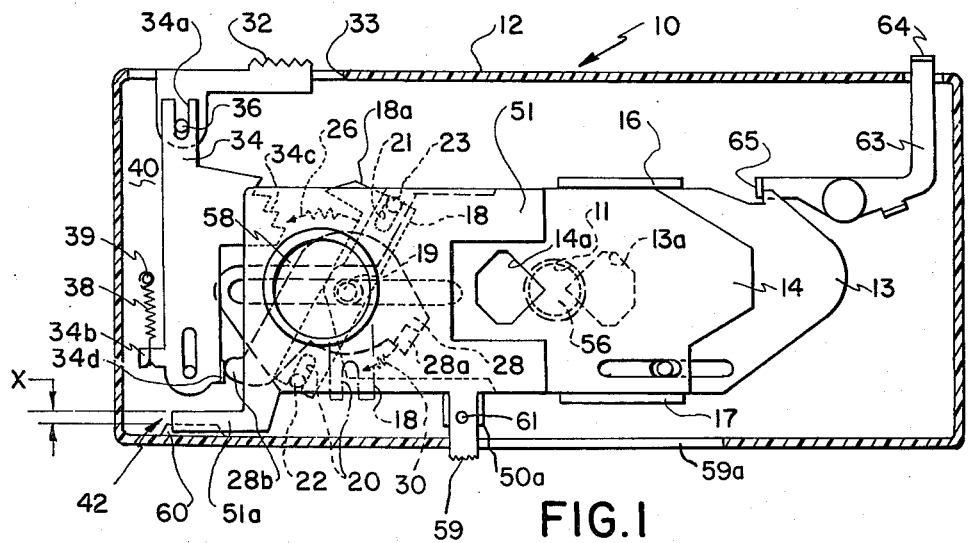
FIG. 1 is a front view, partially in section, of a photographic camera according to the invention and showing an f-stop value setting member located in the upper left hand corner, an interchangeable lens mount and a diaphragm shutter.

As is shown in FIG. 1 of the drawing, a camera 10 having an exposure aperture 11 includes a housing 12 in which is included two cooperatively moving shutter blades 13, 14 which are mounted for slidable movement between spaced guides 16, 17. Blades 13, 14 are respectively provided with aperture openings 13a, 14a, as shown, which depending upon the position of the shutter blades symmetrically overlap to define selectively varying shutter openings or aperture sizes in alignment with exposure aperture 11.

Blades 13, 14 define a varying progression of apertures overlapping exposure aperture 11 due to their interconnection through a transmission rocker 18 which is rotatably mounted about a shaft 19. Transmission rocker 18 is operatively coupled to blades 13, 14 by means of elongate, open-ended slots 20, 21 formed from the ends of the rocker, these slots being adapted to receive respectively pins 22, 23 which extend respectively from blades 14, 13. Rocker 18 is biased in the counterclockwise direction as viewed in FIG. 1 by means of a spring 26 shown diagrammatically to drive blades 13, 14 in opposite directions to establish the progressively larger openings overlapping aperture 11, spring 26 operating to move blade 13 from right to left whereas blade 14 is driven from left to right due to its interconnection via rocker 18. With this arrangement, blades 13, 14 will move conjointly in opposite directions to define a symmetrically configured aperture overlapping exposure aperture 11 when rocker 18 is caused to rotate under the influence of spring 26 about shaft 19.

A shutter resetting member 28 rotatably mounted about shaft 19 includes an ear 28a extending across the plane of transmission rocker 18. Resetting member 28 is biased in the clockwise direction as viewed in FIG. 1 by means of a strong force spring 30 shown diagrammatically and operates when moved under the control of spring 30 to drive transmission rocker 18 in a clockwise direction against spring 26 thereby moving shutter blades 13, 14 to their light-blocking position shown in FIG. 1.

A knurled f-stop value setting member 32 accessible to a camera operator as shown is mounted for slidable movement within a passage 33 formed from housing 12. Setting member 32 is coupled to an indexible control member 34 by means of a pin 36 extending from the setting member and which is slidably received within an elongate open ended slot 34a formed from the top of member 34. Control member 34 is biased or drawn upward toward setting member 32 by means of a weak spring 38, the movable end of the spring being attached to ear 34b while its stationary end is affixed to a pin 39 extending from a camera support plate 40. With this arrangement, control member 34 is slidable and pivotable about pin 36 and can be shifted into various operational positions under the influence of setting member 32 in accordance with an f-stop scale 32a shown in FIG. 2.

Transmission rocker 18 operatively cooperates with indexing steps 34c integral with control member 34, by means of finger member 18a integrally connected to the rocker and located in the plane of the control member. During shutter opening movement, rocker 18 rotates freely in the counterclockwise direction about shaft 19 until finger member 18a engages steps 34c at which time the rocker continues to rotate at a somewhat reduced rate under the influence of spring 26 while urging control member 34 downward against the influence of spring 38 into abutting engagement with an adjustable stop mechanism 42 which operates for a purpose made apparent hereinbelow. During this downward movement, ear 34d is disengaged from nose 28b and shutter resetting member 28 is released to permit ear 28a under the influence of spring 30 to engage transmission rocker 18. When this happens, rocker 18 is rotated in the clockwise direction against spring 26 and shutter blades 13, 14 are driven to their respective light-blocking positions.

Figure 2:
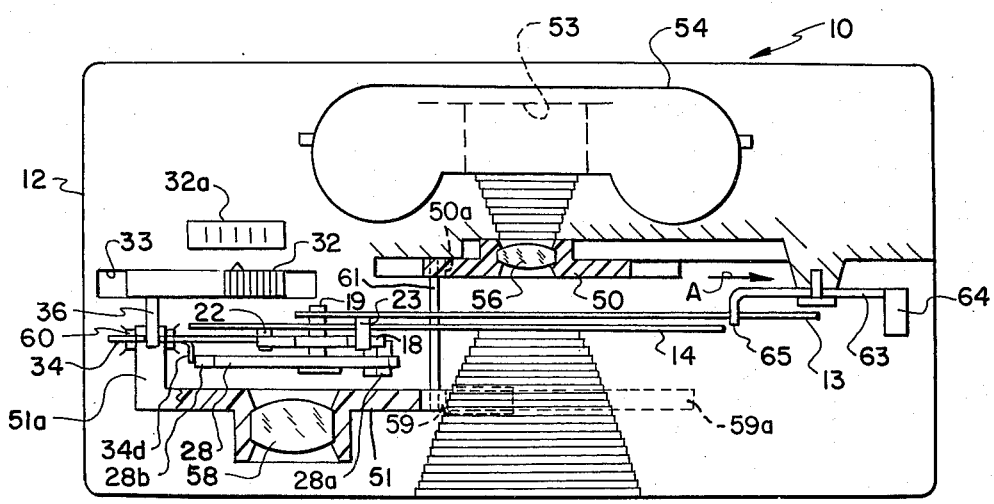
FIG. 2 is the top view of the camera, partially in section, illustrating a film cartridge loaded in the camera and the diaphragm shutter positioned relative to each of a pair of interchangeable lenses.

As is shown most clearly in FIG. 2 mounted within camera 10 are two lens mounts 50, 51 which are mounted for slidable movement parallel to film exposure plane 53 of film cartridge 54 which is positioned relative to exposure aperture 11 as shown. Lens mount 50 is positioned between shutter blades 13, 14 and film exposure plane 53 and mounts a standard objective lens 56, whereas lens mount 51 is positioned on the opposite side of blades 13, 14 in the direction toward the front side of camera 10 and mounts a telephoto lens 58. A knurled lens selector button 59, integrally connected to lens mount 51, is accessible to a camera operator as shown in FIG. 1. Button 59 is mounted for slidable movement within a passage 59a formed from housing 12. Lens mounts 50, 51 are rigidly interconnected by a rod 61 which passes beneath shutter blades 13, 14, one end of the rod being attached to button 59 and the other end being attached to section 50a of lens mount 50, as shown in FIG. 1. Telephoto lens mount 51 is displaced from its position shown in FIG. 2 in the direction of arrow A by the camera operator actuating selector button 59. As this happens, lens mount 50 is moved along by inter-connecting rod 61 out of alignment with the optical axis and telephoto lens 58 is moved into alignment with the optical axis of exposure aperture 11.

The aforementioned adjustable stop mechanism 42 includes an arm 51a connected to telephoto lens mount 51 which arm serves as a stop member or an abutment extending into the path of sliding movement of the aforementioned control member 34. In this position, arm 51a covers an abutment 60 arranged on the bottom of housing 12.

Mounted in the upper right hand corner of camera 10 as viewed in FIG. 1 is a shutter release lever 63. Secured to one end of lever 63 so as to be available to a camera operator is a release button 64 whereas the opposite end 65 of the lever is adapted to latch shutter blade 13 in its light-blocking position.

Prior to film exposure, an f-stop value is selected by shifting setting member 32 in accordance with f-stop scale 32a, the stop value being selected, for instance, as a function of light intensity as may be determined, for example, from a photoconductively controlled light meter or, in the case of flash exposure, as a function of object distance. When a stop value is set, control member 34 is pivoted about pin 36 whereby one of the steps 34c is positioned in the path of rocker 18 to receive finger 18a during shutter opening or light-unblocking movement.

When shutter release button 64 is actuated under operator control, lever 63 is caused to pivot in the clockwise direction, thereby releasing shutter blades 13, 14 to carry out their rundown movements in opposite directions under the influence of rocker 18. As shutter blades 13, 14 move progressively enlarging the diaphragm opening overlapping exposure aperture 11, transmission rocker 18 is rotated counterclockwise due to the influence of spring 26. Following initial movement, finger 18a engages one of the indexing steps 31c, at which time, rocker 18 assumes approximately the position shown in the partial dot-dash lines of FIG. 1 and a preliminary shutter opening is established the size of which is functionally related to the particular step 34c that is engaged by finger 18a. Once this engagement occurs, rocker 18 is rotated counterclockwise a final limited amount to establish the maximum opening width of the shutter blades. During this final limited movement, control member 34 is moved downward contrary to the weak force of spring 38 until its end engages stop mechanism 42.

The extent to which control member 34 is moved in the downward direction during final shutter opening movement determines the effective exposure aperture at which camera 10 is set. When conventional objective lens 56 is aligned with exposure aperture 11, control member 34 comes to rest against arm 51a of telephoto lens mount 51. However, in the case when telephoto lens 58 is aligned with aperture 11 control member 34 is able to carry out a working movement which is increased by an amount X shown in FIG. 1 and makes contact with abutment 60 on the bottom of camera 10. Consequently, the travel path of shutter blades 13, 14 is increased and a larger opening or effective lens aperture is formed. Hence, with the telephoto lens, which has a larger focal length, a larger limiting aperture is automatically set. With this arrangement, the camera f-stop preselected by setting member 32 is the same value regardless of the lens in operation.

When control member 34 is displaced in the downward direction, nose 28b which up to that time abuttingly engages ear 34d is disengaged therefrom and resetting member 28 is released to run down in the clockwise direction under the influence of spring 30. After a short preliminary travel, ear 28a engages transmission rocker 18 and drives the rocker contrary to spring 26 with shutter blades 13, 14 being moved in opposite directions respectively into their light-blocking positions shown in FIG. 1. As this movement occurs, control member 34 is disengaged from finger 18a and is lifted from stop mechanism 42 by means of spring 36. Via a shutter cocking slider (not shown) resetting member 28 can be rotated contrary to spring 30 into its cocked position also shown in FIG. 1 once shutter blades 13, 14 reach their respective light-blocking positions.

The invention has been described in detail with particular reference to a preferred embodiment thereof, but it will be understood that variations and modifications can be effected within the spirit and scope of the invention.

I claim:

1. In a camera of the type having means adapted to locate lens apparatus having a plurality of focal lengths along a picture-taking axis, the improvement comprising:
   a. means actuatable for selecting a particular lens apparatus having a predetermined focal length;
   b. shutter means movable along a path between an initial, light-blocking position and a terminal, light-unblocking position for defining a varying progression of effective exposure apertures in registry with said axis as a function of the position of said shutter means along said path; and
   c. means responsive to selection of said particular lens apparatus for varying said terminal position of said shutter means.

2. In a camera of the type having means adapted for interchangeably locating lenses of different focal length along an optical axis, the improvement comprising:
   a. means actuatable for selecting whichever lens is to be positioned along said optical axis;
   b. a shutter mechanism movable transverse to said optical axis along an operational path between an initial, light-blocking position and a final, light-unblocking position to define a time dependent progressive variation of effective exposure apertures in alignment with said optical axis as a function of the position of said shutter mechanism along said operational path; and
   c. means responsive to whichever lens is selected for arresting said shutter mechanism at a particular final position whereby an effective exposure aperture is established functionally related to the focal length of said selected lens.

3. In a camera having means adapted for selectively locating lens apparatus having a plurality of focal lengths along a picture-taking axis, the improvement comprising:
   a. means for positioning along said axis a particular lens arrangement having a predetermined focal length;
   b. an aperture setting member actuatable over a range of positions each of which is indicative of a particular camera f-stop value;
   c. shutter means movable along a path, having an initial portion and a final portion, between an initial, light-blocking position and a terminal, light-unblocking position for defining a varying progression of effective exposure apertures in alignment with said axis functionally related to the position of said shutter means along said path; and
   d. movement limiting means located in said path of said shutter means for adjusting said initial and final portions thereof to establish an effective exposure aperture which is related to the position at which said setting member is set and said lens arrangement selected.

4. A camera as defined in claim 3 further including:
   a. shutter opening means for effecting movement of said shutter means from said initial position toward said final position; and b. shutter closing means having (1) a tensioned position wherein said closing means is decoupled from said shutter means and (2) a range of released positions assumed in response to said shutter means reaching said final position wherein said shutter closing means is coupled to said shutter means and is enabled for effecting movement of said shutter means toward said initial position.

5. In a camera of the type having an exposure aperture and means adapted for interchangeably locating lenses of different focal length along the optical axis of said exposure aperture, the improvement comprising:

a. means actuatable for selectively positioning a particular lens along said optical axis;

b. an aperture setting member actuatable over a range of positions each of which is indicative of an effective exposure aperture related to anticipated scene light level;

c. shutter means movable (1) along a first operational path between (i) an initial position wherein light is blocked from the exposure aperture and (ii) an intermediate position wherein a shutter opening is established having a magnitude functionally related to the location of said intermediate position along the focus of said first operational path and (2) along a second operational path between (i) said intermediate position and (ii) a terminal position wherein an effective lens aperture is established having a magnitude functionally related to the location of said intermediate and said terminal positions defining said second operational path; and d. stop means arranged in said second operational path of said shutter means responsive to said lens positioning means for adjustably locating said terminal position, whereby an effective lens aperture is established as a function of lens focal length and anticipated light.

6. A camera as defined in claim 5 wherein said intermediate position is adjustably varied in accordance with the position at which said aperture setting member is located.

7. A camera as defined in claim 5 wherein said terminal position is adjustably varied in accordance with whichever of said lenses is located along said optical axis.

8. A camera as defined in claim 5 wherein a. said intermediate position is established by means of a control member adapted to couple said aperture setting member to said shutter means, said control member including means defining a plurality of indices, each index being arrangeable along said first operational path to variably locate said intermediate position as a function of the particular position at which said aperture setting member is set, said control member being adapted to be engaged by said shutter means when the latter reaches said intermediate position to cause said control member to move with said shutter means along said second operational path; and b. said stop means includes means defining an abutment the location of which is alterable in accordance with whichever lens is located along said optical axis, said abutment being adapted to engage said control member to thereby locate said shutter means in said terminal position.

* * * * *